Figure 1:
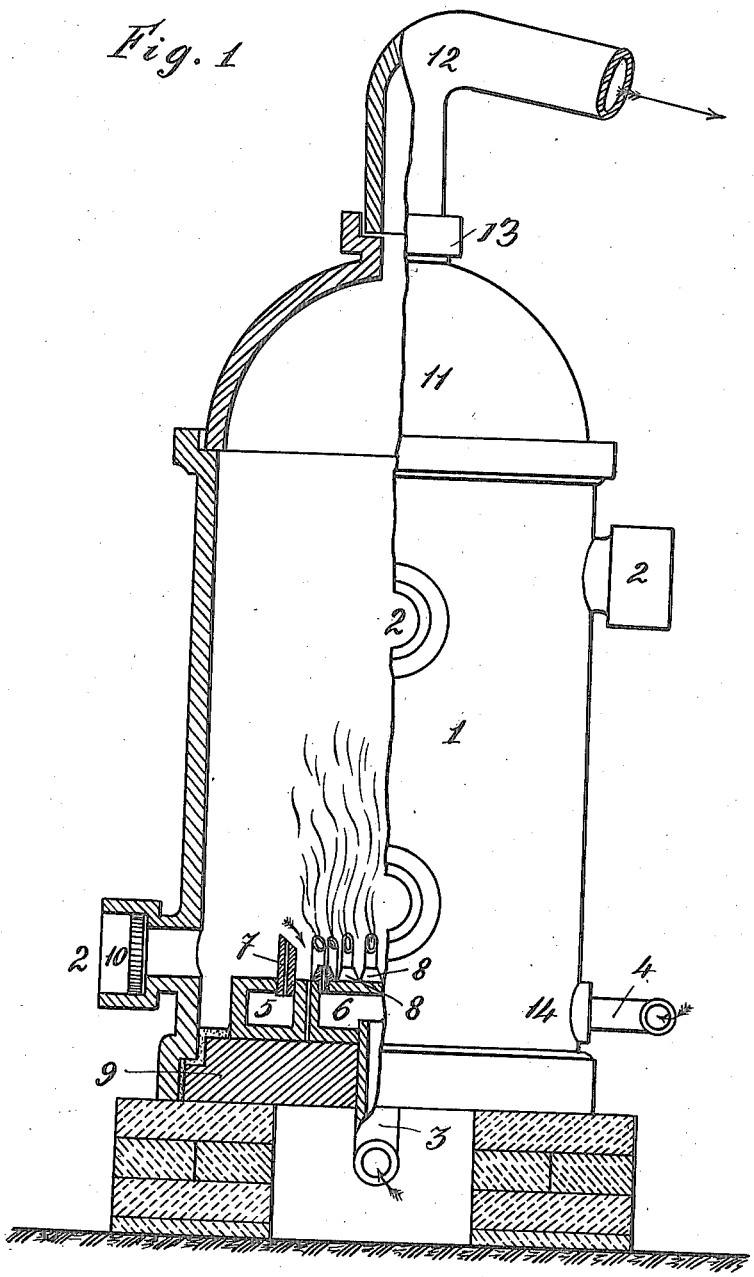

L. SCHERBEL.
APPARATUS FOR PRODUCING HYDROCHLORIC ACID.
APPLICATION FILED JAN. 20, 1915.
1,184,576.
Patented May 23, 1916.
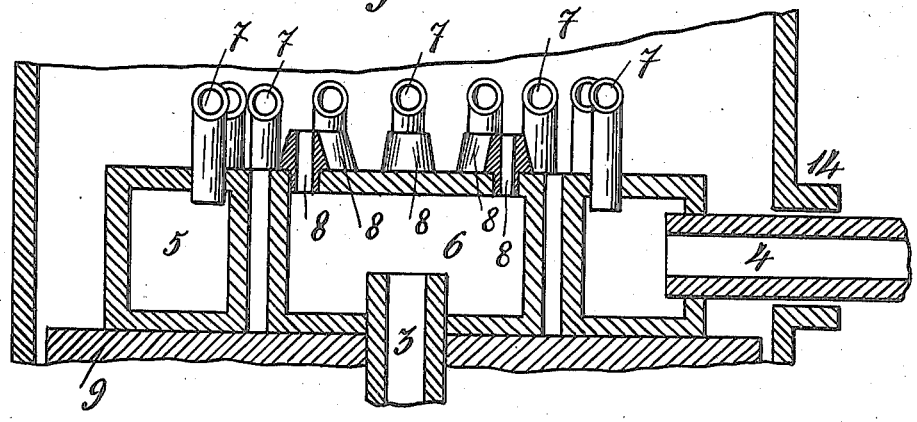
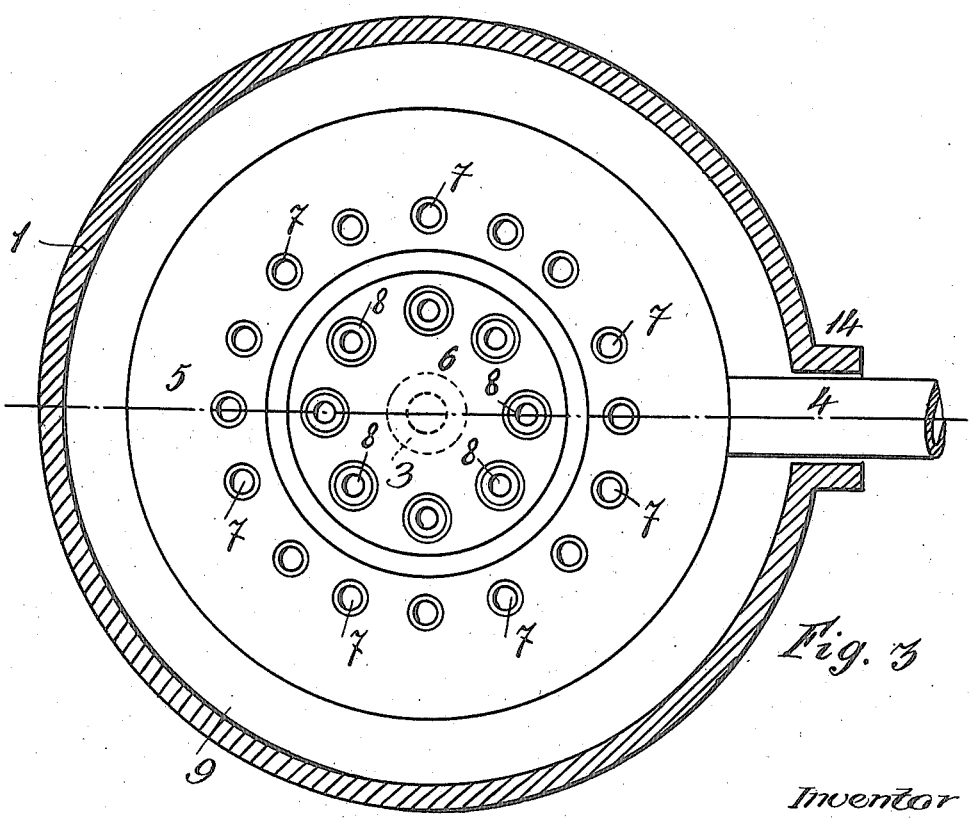

UNITED STATES PATENT OFFICE.

LUDWIG SCHERBEL, OF BUSSI, ITALY.

APPARATUS FOR PRODUCING HYDROCHLORIC ACID.

1,184,576.   Specification of Letters Patent.   Patented May 23, 1916.

Application filed January 20, 1915.   Serial No. 3,399.

*To all whom it may concern:*

Be it known that I, LUDWIG SCHERBEL, a subject of the Emperor of Germany, and residing at Bussi, Province of Aquila, Italy, have invented certain new and useful Improvements in Apparatus for Producing Hydrochloric Acid, of which the following is a specification.

The object of the invention is to prepare by direct synthesis from chlorin and hydrogen, hydrochloric acid in the form of a gas either pure and concentrated or diluted by inactive gases, or in the form of an aqueous solution of any desired concentration and degree of purity.

The process of producing hydrochloric acid by direct synthesis from its constituent elements, is in theory well known in chemistry and consists, of course, in establishing a combustion between the two elements or substantially in burning chlorin in an atmosphere of hydrogen or hydrogen in an atmosphere of chlorin. In practice, however, for commercially manufacturing large quantities of hydrochloric acid, the synthesis of the elements chlorin and hydrogen offers many difficulties on account of the danger of explosion and also because it is not easy to secure a complete combustion. Various methods have been proposed for overcoming these objections. According to some modes the two gases are mixed before the combustion by passing them through tubes shaped like an inverted Y, or through concentric tubes, and they are then ignited by an electric spark, while other modes make it an imperative condition that the chlorin be burnt in an excess of hydrogen or to carry out the combustion in the presence of heated powdered charcoal. All these modes however are unsuitable in practice.

According to this invention, all the difficulties and dangers of the synthetic production of chlorin and hydrogen are avoided by burning chlorin in an atmosphere of hydrogen or hydrogen in an atmosphere of chlorin in the manner of an ordinary flame, for example a gas flame, burning in air, care being taken only continuously and expeditiously to draw off the gaseous hydrochloric acid produced and the other gases which may accompany it, so that one of the gases be completely burnt in the atmosphere of the other. This result is obtained substantially by drawing off the gases from the burner, viz. by creating therein a vacuum by means of some suitable device, for example, by a centrifugal aspirator or by a pump with acid proof liquid plungers, and by controlling the quantity of gases to be burnt by any suitable known means, as by a meter, so that there may never be in the burner or in the absorption apparatus an explosive mixture of gases.

The invention may of course be realized in a variety of types of burners, but the preferred construction, which has given most satisfactory results, is shown in the accompanying drawings, in which—

Figure 1 is a side elevation of the burner, partly in section. Fig. 2 is a vertical section; and Fig. 3 is a sectional plan through the nozzles of the burner, these two figures being drawn on an enlarged scale.

The burner shown in the drawing, consists essentially of a cylindrical body 1 of refractory material provided with a number of sight-holes 2 for observing the flames and any manipulation which may be necessary. These sight-holes are arranged in cup-shaped sleeves or flanges made in one piece with the cylinder 1, and are closed by a plate 10 of transparent quartz, fastened in the sleeve by a joint of incombustible material, such as asbestos. The cylinder is surmounted by a dome 11, carrying the flange 13 for fastening the outlet pipe 12 for the combustion gases. The cylinder is closed at the bottom by a plate 9 of refractory material and of suitable thickness, which is hammered in and on which rest the co-axial circular boxes 6 and 5 or similar devices. Into the center of the bottom of the central box enters the inlet tube 3 for one of the gases (for example, hydrogen), which extends through the plate 9, and from the top of this box springs a series of nozzles 8, arranged on the circumference of a circle. The outer box 5, which is co-axial with the box 6, carries laterally a tube 4 extending through the cylinder 1 at 14, and serving for admitting the other gas (for example, chlorin). This box carries a series of burners 7 arranged concentrically with the first burners; the number of burners 7 exceeds that of burners 8, and they extend to a higher level; and are provided with a beveled upper surface. Both the boxes and the nozzles may be given any other suitable shape, without altering the invention. For example, the number of crowns of nozzles may be increased by arranging on each of the boxes 5 and 6 two or more concentric series, instead of one single series.

The combustion is started by igniting the hydrogen in an atmosphere of air, whereafter a vacuum is created in the burner through the absorption battery (not shown), and the chlorin is injected. The combustion is controlled in any suitable way, for example by simply watching the appearance of the flame through the sight-holes 2. The arrangement of the flames permits the most perfect contact between the supporter of combustion and the fuel, and also the working of the burner with either a hydrogen flame or a chlorin flame, according to whether the one or the other of the two gases is in excess, without the gases mixing before the combustion. The combustion takes place thus in the manner of an ordinary flame in an atmosphere of air. While the combustion proceeds, the vacuum in the burner is continuously maintained, and the gas produced by the combustion continuously removed. This continual removal of the gas produced by the combustion permits the output of a very large quantity of acid without danger of the high temperature of the reaction causing the burner to be excessively heated. The temperature of the flame may be kept lower by introducing into the burner chlorin diluted with air or with inactive gases, instead of pure chlorin.

These are features of capital importance, as they permit of manufacture on an industrial scale which is not the case with similar known processes adapted for only a small output.

The process also removes all danger of explosion, because in case the supply of one of the gases should unexpectedly fail, nothing happens but the extinction of the flames, while the rapid passage of the other gas cools the burner, so that no explosion can occur when the gas, which has been failing, is supplied again at once.

It is advisable to subject the hydrochloric acid produced to an intense cooling before its arrival in the absorption apparatus or in the aspirator, so that the temperature of the gas is maintained at 40° C., for example, by causing it to pass through serpentine coolers or cooling towers of sandstone cooled by means of water or saline solutions, which is especially useful when the hydrochloric acid has been diluted and aqueous vapor is formed, which may thus be condensed.

The purity of the hydrochloric acid depends of course on the nature of the materials of which the apparatus is made which must be such as not to give off impurities, for example, quartz, porcelain, white sandstone, and on the purity of the gases (chlorin and hydrogen) employed. As there are no technical difficulties in obtaining these elements in the required condition of purity and concentration, and as the molecular proportion of the two elements may be controlled, nothing prevents the production of a hydrochloric acid of any desired degree of purity and concentration. It is also possible to remove the water and to obtain pure and dry gaseous hydrochloric acid by a suitable treatment, for instance by desiccating the products of the combustion before their arrival in the aspirator, for example, by means of calcium chlorid or sulfuric acid or the like. By varying the purity of the constituent elements and the proportions in which they are employed, it is also possible to obtain gaseous hydrochloric acid as moist or as diluted with other inactive gases as desired. A regular current of gaseous hydrochloric acid may thus be set up under the desired pressure, and predetermined quantities of hydrochloric acid of known and uniform composition.

What I claim is:—

In an apparatus for the manufacture of hydrochloric acid, the combination with a combustion chamber and an outlet at the upper portion thereof for conducting away products of combustion, of a burner apparatus located at the lower portion of the combustion chamber, said apparatus including a central hollow chamber, an inlet leading into said chamber, a plurality of removable burner tips located at the upper portion of said chamber and arranged in circular formation, a hollow annular chamber surrounding the central chamber, an inlet leading into said annular chamber, a plurality of jets located on the upper surface of the annular chamber, said jets being disposed in circular formation and concentric with relation to the aforesaid burner tips, all of said jets having their upper surfaces beveled with said surfaces directed toward the center of the burner tips.

In testimony whereof I have signed my name in the presence of two subscribing witnesses the 19th day of December, 1914.

LUDWIG SCHERBEL.

Witnesses:
 GUSTAV TAHDEN,
 CORELLO FORDHAM.